Aug. 19, 1924.

R. C. BAIRD

PENDULUM LEVEL

Filed Nov. 16, 1923

1,505,618

Inventor
Roswell C. Baird.
By Adam E. Fisher
J.G. Attorney

Patented Aug. 19, 1924.

1,505,618

UNITED STATES PATENT OFFICE.

ROSWELL C. BAIRD, OF CUMBERLAND, WISCONSIN.

PENDULUM LEVEL.

Application filed November 16, 1923. Serial No. 675,065.

*To all whom it may concern:*

Be it known that ROSWELL C. BAIRD, a citizen of the United States, residing at Cumberland, in the county of Barron and State of Wisconsin, has invented certain new and useful Improvements in Pendulum Levels, of which the following is a specification.

This invention is in the way of a gravity degree level, and the object of the invention is to provide a mechanic's level and plumb, wherein a pivoted and weighted pointer or indicator is employed instead of a glass tube filled with alcohol or the like. It is claimed that the instrument constructed in accordance with this invention will give more accurate and reliable results, and will not so easily get out of order as the "spirit" level.

In the drawing

Figure 1:
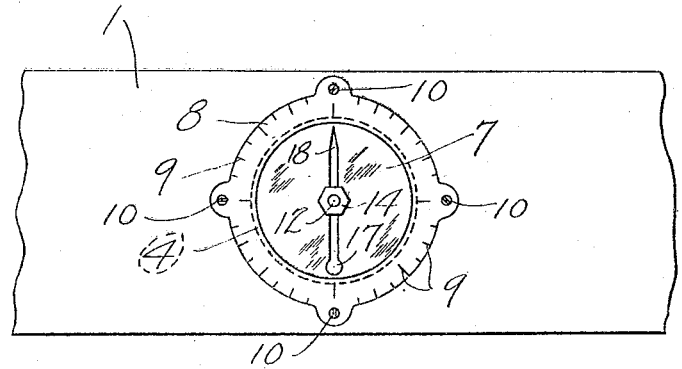
Figure 1 is a side elevation.
Figure 2:
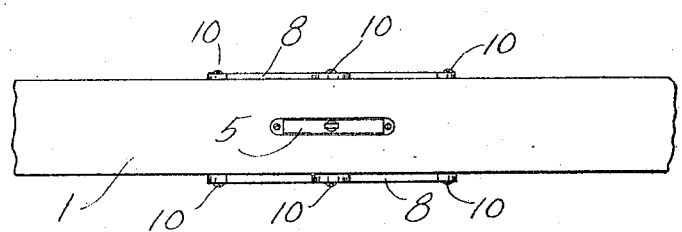
Figure 2 is a top view.
Figure 3:
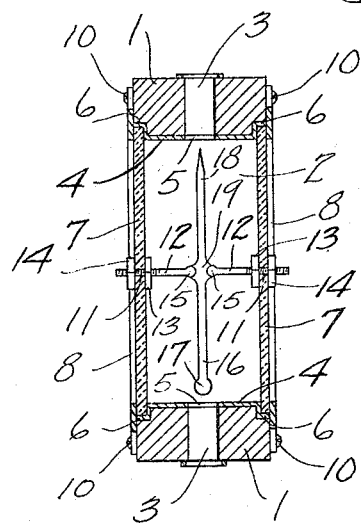
Figure 3 is a medial, transverse section.

The invention is incorporated in the usual elongated, rectangular bevel block or stock 1. In carrying out the invention, a round housing aperture 2 is formed transversely through the center of the stock 1, and elongated sight slots 3 are cut down through the two edges of the stock into the aperture 2. A cylindrical indicator housing 4 is firmly seated through the aperture 2, the said housing having at opposite sides sight slots 5 in register with the slots 3 of the stock 1. Annular shoulders 6 are formed at each end of the cylindrical housing 4 adapted to engage and hold transparent disc crystals 7. Metal indicator collars 8, having degree marks 9 stamped thereon, are then mounted over the crystals 7 and secured to the stock 1 by screws 10. Shaft holes 11 are formed through the exact centers of the crystals 7 and supporting shafts 12 are mounted through these holes from each side of the stock 1. This mounting is accomplished by threading the outer end of each of the shafts 12 at the point where they pass through the crystals, and then placing two nuts 13 and 14 on each of these ends, one on the inner side of the crystal and one on the outer side thereof, thus locking the shafts rigidly perpendicularly and adjustably to the crystals. Balls 15 are formed on the inner ends of the shafts 12. An indicator arm 16 is weighted at its lower end 17, pointed at its upper end 18, and formed with medial oppositely disposed sockets 19 adapted to be engaged by the balls 15 of the shafts 12, whereby the indicator arm 15 is supported pivotally in position between the shafts 12. By a proper adjustment of the nuts 13 and 14 and oiling the bearings of the arm 15, the latter may be made to swing freely and steadily. The use and operation of the device is apparent from the foregoing description.

While I have herein described a certain specific manner and method of constructing and assembling the elements of my invention, it is understood that I may vary from the same in minor details, not departing from the spirit of my invention, so as best to construct a practical device for the purpose intended, as defined in the appended claim.

I claim:

A device of the kind described, comprising a bevel stock having a round, medial, transverse housing aperture with sight slots opening thereinto from top and bottom of the stock; a cylindrical indicator housing mounted within the said aperture, the said housing having sight slots registering with the sight slots of the stock; a disc crystal mounted at each end of the said housing, the said crystals having shaft holes formed centrally therethrough; calibrated collars mounted over the edges of each of said crystals and secured to the stock; supporting shafts mounted through the shaft holes of the crystals, the said shafts being threaded at the outer ends passing through the crystals and each having a ball formed on its inner end; adjustment nuts on the threaded ends of the supporting shafts, one inside and one outside each crystal; and an indicator arm weighted at one end and pointed at the other pivoted between the ball-like inner ends of the supporting shafts, the said arm having medial and oppositely disposed sockets adapted to pivotally engage the said ball-like ends of the shafts.

In testimony whereof I affix my signature.

ROSWELL C. BAIRD.

Witnesses:
LEWIS LARSON,
VALENTINE L. EWALD.